(12) United States Patent
Kuzee et al.

(10) Patent No.: US 6,613,899 B1
(45) Date of Patent: Sep. 2, 2003

(54) METHOD FOR PREVENTING DEPOSITS IN OIL EXTRACTION

(75) Inventors: Hendrika Cornelia Kuzee, Oost Souburg (NL); Hendricus Wilhelmus Carolina Raaijmakers, Roosendaal (NL)

(73) Assignee: Cooperatie Cosun U.A., Roosendaal (NL)

( * ) Notice: Subject to any disclaimer, the term of this patent is extended or adjusted under 35 U.S.C. 154(b) by 0 days.

(21) Appl. No.: 09/719,239

(22) PCT Filed: Jun. 9, 1999

(86) PCT No.: PCT/NL99/00358

§ 371 (c)(1),
(2), (4) Date: Dec. 11, 2000

(87) PCT Pub. No.: WO99/64716

PCT Pub. Date: Dec. 16, 1999

(30) Foreign Application Priority Data

Jun. 9, 1998 (NL) .............................................. 1009356

(51) Int. Cl.[7] .......................... C07H 1/00; C07G 11/00; C02F 1/00; C02F 5/10
(52) U.S. Cl. ........................ 536/124; 536/1.11; 536/4.1; 536/123; 210/698; 252/180; 252/175
(58) Field of Search ................................ 536/1.11, 4.1, 536/123, 124; 210/698; 252/180, 175, 102

(56) References Cited

U.S. PATENT DOCUMENTS 3,596,766 A * 8/1971 Johnston et al.
4,561,982 A * 12/1985 Kuryama et al.
5,777,090 A * 7/1998 Verraest et al.

FOREIGN PATENT DOCUMENTS

| FR | 2570755 | * | 3/1986 |
| GB | 1169055 | | 10/1969 |
| GB | 2248830 | * | 4/1992 |
| WO | WO 98/06756 | | 2/1998 |
| WO | WO 98/25972 | | 6/1998 |

* cited by examiner

*Primary Examiner*—Kathleen K. Fonda
*Assistant Examiner*—Traviss C. McIntosh, III
(74) *Attorney, Agent, or Firm*—Young & Thompson

(57) ABSTRACT

Carboxyl-containing fructans such as carboxymethylinulin can be successfully used to prevent deposition of scale composed of, for example, calcium, barium and strontium salts of sulphuric acid and carbonic acid in oil extraction. In the oil extraction method, 0.5–200 ppm of a carboxyl-containing fructan that contains 0.3–3 carboxyl groups per mono-saccharide unit is incorporated in the process water, in the process equipment or in the oil-containing formation.

22 Claims, No Drawings

METHOD FOR PREVENTING DEPOSITS IN OIL EXTRACTION

BACKGROUND OF THE INVENTION

The invention relates to a method for preventing deposition of metal salts during oil extraction.

Water is widely used in the extraction of oil. The water is injected under pressure into the oil reservoir. The oil present in the rock is displaced by the water into production wells a short distance away. The oil-bearing rocks also contain water, referred to as formation water. This formation water usually contains potential scale-forming metal ions, such as barium, calcium and strontium. Under certain conditions these cations give insoluble products. Many oil fields are located offshore, where use is made of seawater for the displacement of the oil. Seawater contains high concentrations of sulphate and carbonate ions. When the seawater mixes with the formation water, this gives rise to the formation of insoluble salts, such as barium sulphate, calcium sulphate and calcium carbonate. This leads to deposits, not only in the porous rocks but also in pipes and other equipment that is used for the extraction of oil. The formation water also contains radioactive materials which are incorporated in the deposit formed. Consequently, when removing the deposit, measures have to be taken to protect employees and the environment.

Scale formation can be controlled in various ways:
a) For calcium carbonate scale the balance can be shifted towards (soluble) bicarbonate by adding an acid or $CO_2$. However, acid addition does not have the desired effect, partly because corrosion occurs and because of the buffering action of the seawater. Large quantities of acid are needed to lower the pH sufficiently, as a result of which the process is economically unattractive.
b) Equipment can be periodically chemically or mechanically cleaned to remove scale. Chemical cleaning can be carried out by making use of strong acids or complexing agents such as EDTA. The disadvantage is that deposition in the rocks themselves is not tackled by this means and that environmental drawbacks are associated with this method.
c) The formation of a deposit can be prevented by the use of scale inhibitors. These are substances which greatly reduce the formation of scale, partly by inhibiting crystal growth. Such inhibitors are the most attractive from the technical and economic standpoint.

Substances which have been proposed or are used as scale inhibitors include polyacrylates, polyacrylamide, aminophosphonates and phosphonates. For instance the use of various N-phosphonomethyl-polyamines as scale inhibitors is described in GB-A 2 248 830 and WO 97/21905. The disadvantage of such products is that they are based on petrochemical, and thus non-renewable, raw materials, that they are not biodegradable and that some are toxic to the water environment. The environmental profile of the chemical additives which are used for oil extraction is playing an increasingly more significant role. This applies in particular in the case of oil extraction in the North Sea. Products are classified on the basis of, inter alia, biodegradability and aquatic toxicity, there being a strong preference for the best classified products. There is therefore an increasing need for scale inhibitors which have a good environmental profile. Moreover, many known scale inhibitors, especially the phosphonates, have a reduced performance in the presence of iron ions; high concentrations of iron ions may occur as a result of corrosion of pipelines and equipment, leading to iron scale such as $Fe(OH)_3$ and $FeCO_3$.

In U.S. Pat. No. 4,561,982 oxidised polysaccharides, such as starch, cellulose and carboxy-methylcelluilose, are proposed as scale inhibitors. At least some of the glucose rings in these polysaccharides have been oxidised to groups having the formula: —CH(COOH)—CHA—O—CH(COOH)—O—, where A is $CH_2OH$, $CH_2OCH_2COOH$ or COOH. The proposed application is in cooling water systems, desilting installations, geothermal installations and the like; oil extraction and seawater are not mentioned.

SUMMARY OF THE INVENTION

It has now been found that the need for improved agents for scale inhibition in oil and gas extraction can be met by the use of carboxyl-containing inulin and other carboxyl-containing fructans. These derivatives have a good scale-inhibiting action, are bio-degradable and are non-toxic; also, their performance is not affected by the presence of iron ions.

DESCRIPTION OF THE PREFERRED EMBODIMENTS

In this context fructans are understood to include all oligosaccharides and poly-saccharides which have a majority of anhydrofructose units. The fructans can have a polydisperse chain length distribution and can be straight-chain or branched. The fructan can contain mainly β-2,6 bonds, as in levan. Preferably the fructan contains mainly β-2,1 bonds, as in inulin.

In this context carboxyl-containing fructans are understood to be a derivative of inulin or another fructan that contains 0.3–3 carboxyl groups per anhydrofructose unit. In particular, the derivative contains at least 0.8 carboxyl groups per anhydrofructose unit. The carboxyl groups can be present in the form of carboxyalkyl groups, such as carboxymethyl, carboxyethyl, dicarboxyrnethyl or carboxyethoxycarbonyl groups. These can be obtained by etherification of the fructan in a known manner. The carboxyl groups can also be present in the form of oxidised hydroxymethylene or hydroxymethyl groups. Mixed carboxyfructans can also be used. Preferably, the number of carboxymethyl groups is greater than the number of other carboxyl groups. Carboxymethylinulin (CMI) is the most preferred.

Carboxymethylinulin (CMI) with a DS of 0.15–2.5 is disclosed in WO 95/15984 and in the article by Verraest et al. in *JAOCS*, 73 (1996) pp. 55–62. It is prepared by reaction of a concentrated solution of inulin with sodium chloroacetate at elevated temperature. Carboxylethylinulin (CEI) is disclosed in WO 96/34017. The oxidation of inulin is, for example, disclosed in WO 91/17189 and WO 95/12619 (C3–C4 oxidation, leading to dicarboxyinulin, DCI) and WO 95/07303 (C6 oxidation). In the case of mixed carboxyl derivatives the inulin can have been first carboxymethylated and then oxidised or (preferably) the other way round.

The carboxyl-containing fructan has an average chain length (=degree of polymerisation, DP) of at least 3, rising to about 1000. Preferably, the average chain length is 6–60 monosaccharide units. The fructan can optionally have been subjected to a reduction treatment beforehand in order to remove reducing groups.

Modified fructan derivatives which according to the invention can be converted to carboxyalkylfructans are, for example, fructans in which the chain length has been enzymatically extended, and fructan hydrolysis products, that is to say fructan derivatives having a shortened chain, and fractionated products having a modified chain length. Fractionation of fructans such as inulin can be effected by, for example, low temperature crystallisation (see WO 94/01849), column chromatography (see WO 94/12541), membrane filtration (see EP-A 440 074 and EP-A 627 490) or selective precipitation with alcohol. Prior hydrolysis to produce shorter fructans can, for example, be effected enzymatically (endo-inulinase), chemically (water and acid) or by heterogeneous catalysis (acid column). Hydroxyalkylated and/or cross-linked fructans can also be used in the method according to the invention after carboxyalkylation and, if appropriate, oxidation.

The carboxymethylfructan can be used in the form of the purified substance, but use can also be made of the technical grade product obtained directly by carboxymethylation. Specifically, it has been found that any impurities, such as glycolic acid and diglycolic acid, have no adverse effects on the action of the CMI. It is possible to make use of the free acid, but also of a salt, such as the sodium, potassium or amnmnonium salts.

The concentration of carboxyl-containing fructan, in particular CMI, in the process water is in general between 0.5 and 200 ppm (parts by weight) and in particular between 2 and 50 ppm. It is also possible to use mixtures of the carboxyl-containing fructan and other scale inhibitors such as polyacrylates or phosphonates, preferably in a ratio of at least 1 part carboxyl-containing fructan to 1 part other agent.

The scale inhibitor can be added to seawater and pumped into the oil-bearing formation in this way. The inhibitor can also be introduced at specific locations in the process equipment where extensive deposits are formed. The inhibitor can also be injected continuously into the fluids on the bottom of the oil well. Yet a further technique is the "squeeze" technique, where the inhibitor is introduced into the rock. The inhibitor precipitates and/or is adsorbed by the formation. In the course of time sufficient inhibitor is released via desorption in order to prevent scale formation. After a few months the reservoir of scale inhibitor has been used up and the process is repeated. The application is not restricted to oil extraction at sea, but also relates to other extraction processes where water is used as a displacement agent, not only at sea, but also on land.

EXAMPLE 1

The scale-inhibiting action of CMI (DP≈10) was determined for calcium carbonate. A saturated calcium carbonate solution was prepared by mixing a calcium chloride solution with a sodium carbonate solution, with a maximum quantity of calcium carbonate to be formed of 95 mg/l. 1 mg/l or 5 mg/l of inhibitor was added to the solution. The pH of the solution was adjusted to 10.0 and the solution was then set on one side at 75° C., with shaking. After 20 hours the solution was filtered through a White Band filter and the calcium content of the filtrate was determined. The action of the inhibitor was calculated on the basis of the calcium value for the experiment without inhibitor (0 percent inhibition) and the calcium value at which no precipitate was formed (100 percent inhibition). This gave the results as specified in Table 1.

TABLE 1

|  | Inhibition with 1 mg/l | Inhibition with 5 mg/l |
| --- | --- | --- |
| CMI DS = 1.0 | 88 | 100 |
| CMI DS = 2.0 | 21 | 100 |
| Polyacrylate 4500 | 60 | 100 |

EXAMPLE 2

The scale-inhibiting action of CMI (DP≈10) was determined for calcium sulphate. A saturated calcium sulphate solution was prepared by mixing a calcium chloride solution with a sodium sulphate solution, with a maximum amount of calcium sulphate to be formed of 10,000 mg/l. 1 mg/l, 5 mg/l or 10 mg/l inhibitor was added to the solution. The pH of the solution was adjusted to 7.0 and the solution was then left to stand at 30° C. After 20 hours the solution was filtered through a Red Band filter and the calcium content of die filtrate was determined. The action of the inhibitor was calculated on the basis of the calcium value of the experiment without inhibitor (0 per cent inhibition) and the calcium value at which no precipitate was formed (100 per cent inhibition). This gave the results as specified in Table 2.

TABLE 2

|  | Inhibition with 1 mg/l | Inhibition with 5 mg/l | Inhibition with 10 mg/l |
| --- | --- | --- | --- |
| CMI DS = 1.0 | 11.7 | 77.8 | 90.5 |
| CMI DS = 2.0 | 23.1 | 90.0 | 93.0 |
| Phosphonate | 35.9 | 87.6 | 89.2 |
| Polyacrylate 4500 | 29.1 | 89.7 | 92.4 |

EXAMPLE 3

Example 2 (calcium sulphate scale inhibition) was repeated, except that the solution was filtered after 7 days instead of 20 hours. The results are specified in Table 3.

TABLE 3

|  | Inhibition (%) with 1 mg/l | Inhibition (%) with 5 mg/l | Inhibition (%) with 10 mg/l |
| --- | --- | --- | --- |
| CMI DS = 1.0 | 5.2 | 81.0 | 87.3 |
| CMI DS = 2.0 | 8.0 | 92.4 | 93.9 |
| Phosphonate | 2.7 | 56.9 | 86.9 |
| Polyacrylate 4500 | 5.3 | 88.6 | 89.6 |

EXAMPLE 4

The scale-inhibiting action of CMI (DP≈10) was determined for barium sulphate. A saturated barium sulphate solution was prepared by mixing a barium chloride solution (380 mg/l) with a sodium sulphate solution (3350 mg/l) in a 1:1 ratio, with a maximum amount of barium sulphate to be formed of 210 mg/l. 5 mg/l, 10 mg/l or 15 mg/l of inhibitor was added to the solution. The pH of the solution was adjusted to 5.5 by addition of 1 ml acetate buffer (3.6 g sodium acetate trihydrate and 0.5 g acetic acid per 100 ml) per 100 ml. The solution was then left to stand at 80° C. After 10 hours the solution was filtered by suction through a 0.45 μm Millipore filter and the barium content of the filtrate was determined. The action of the inhibitor was calculated on the basis of the barium value for the experiment without inhibitor (0 per cent inhibition) and the barium value at which no precipitate was formed (100 per cent inhibition). The results are given in table 4.

TABLE 4

|  | Inhibition (%) with 5 mg/l | Inhibition (%) with 10 mg/l | Inhibition (%) with 15 mg/l |
|---|---|---|---|
| CMI DS = 1.0, DP = 10 | 15.0 | 27.5 | 57.5 |
| CMI DS = 2.0, DP = 10 | 78.0 | 96.5 | 100 |
| CMI DS = 2.0, DP = 20 | 82.5 | 98.0 | 100 |
| Pentaphosphonate (DETPMP) | 18.0 | 38.5 | 55.5 |

EXAMPLE 5

Example 4 was repeated, with the exception that the barium sulphate solution contained 38 mg/l of $Fe^{2+}$ ions. The results are given in table 5.

TABLE 5

|  | Inhibition (%) with 5 mg/l | Inhibition (%) with 10 mg/l | Inhibition (%) with 15 mg/l |
|---|---|---|---|
| CMI DS = 2.0, DP = 10 | 75.0 | 92.0 | 98.5 |
| CMI DS = 2.0, DP = 20 | 80.5 | 96.0 | 99.0 |
| Pentaphosphonate (DETPMP) | 12.0 | 21.5 | 34.5 |

What is claimed is:

1. A method of preventing deposition of scale on surfaces exposed to process sea water in an oil extraction process that uses sea water, the method comprising the steps of:
   pumping process sea water into a rock formation from which oil is to be extracted; and
   preventing deposition of scale that comprises calcium, barium and strontium salts on the surfaces exposed to the process sea water by adding a carboxyl-containing fructan that contains 0.3–3 carboxyl groups per monosaccharide unit to the process sea water so that a concentration of the carboxyl-containing fructan in the process sea water is 0.5–200 ppm.

2. The method according to claim 1, wherein the concentration is 2 to 50 ppm.

3. The method according to claim 1, wherein the carboxyl-containing fructan contains at least 0.8 carboxyl groups per monosaccharide unit.

4. The method according to claim 1, wherein the carboxyl-containing fructan contains 0.7–2.5 carboxymethyl groups per monosaccharide unit.

5. The method according to claim 1, wherein the carboxyl-containing fructan is a carboxymethylinulin having an average degree of polymerization of 6–60.

6. The method according to claim 1, wherein the method prevents deposition of scale that comprises carbonate and sulphate salts.

7. The method according to claim 1, wherein the method prevents deposition of scale that comprises iron salts.

8. The method according to claim 1, wherein the fructan is a purified carboxyalkylfructan.

9. A method of preventing deposition of scale on oil extraction equipment that extracts oil from an oil-containing rock formation using sea water, the method comprising the step of introducing a carboxyl-containing fructan that contains 0.3–3 carboxyl groups per monosaccharide unit onto locations on the oil extraction equipment exposed to sea water where calcium, barium and strontium salt scale forms to prevent formation of this scale.

10. The method according to claim 9, wherein the carboxyl-containing fructan contains at least 0.8 carboxyl groups per monosaccharide unit.

11. The method according to claim 9, wherein the carboxyl-containing fructan contains 0.7–2.5 carboxymethyl groups per monosaccharide unit.

12. The method according to claim 9, wherein the carboxyl-containing fructan is a carboxymethylinulin having an average degree of polymerization of 6–60.

13. The method according to claim 9, wherein the method prevents deposition of scale that comprises carbonate and sulphate salts.

14. The method according to claim 9, wherein the method prevents deposition of scale that comprises iron salts.

15. The method according to claim 9, wherein the fructan is a purified carboxyalkylfructan.

16. A method of preventing deposition of scale on an oil-containing rock formation in an oil extraction process that extracts oil from the oil-containing rock formation using sea water, the method comprising the steps of introducing a carboxyl-containing fructan that contains 0.3–3 carboxyl groups per monosaccharide unit into the rock formation that has been exposed to sea water so that the fructan is adsorbed by the rock formation, and then desorbing the fructan from the rock formation to prevent formation of this scale on the rock formation.

17. The method according to claim 16, wherein the carboxyl-containing fructan contains at least 0.8 carboxyl groups per monosaccharide unit.

18. The method according to claim 16, wherein the carboxyl-containing fructan contains 0.7–2.5 carboxymethyl groups per monosaccharide unit.

19. The method according to claim 16, wherein the carboxyl-containing fructan is a carboxymethylinulin having an average degree of polymerization of 6–60.

20. The method according to claim 16, wherein the method prevents deposition of scale that comprises carbonate and sulphate salts.

21. The method according to claim 16, wherein the method prevents deposition of scale that comprises iron salts.

22. The method according to claim 16, wherein the fructan is a purified carboxyalkylfructan.

* * * * *